Figure 1:
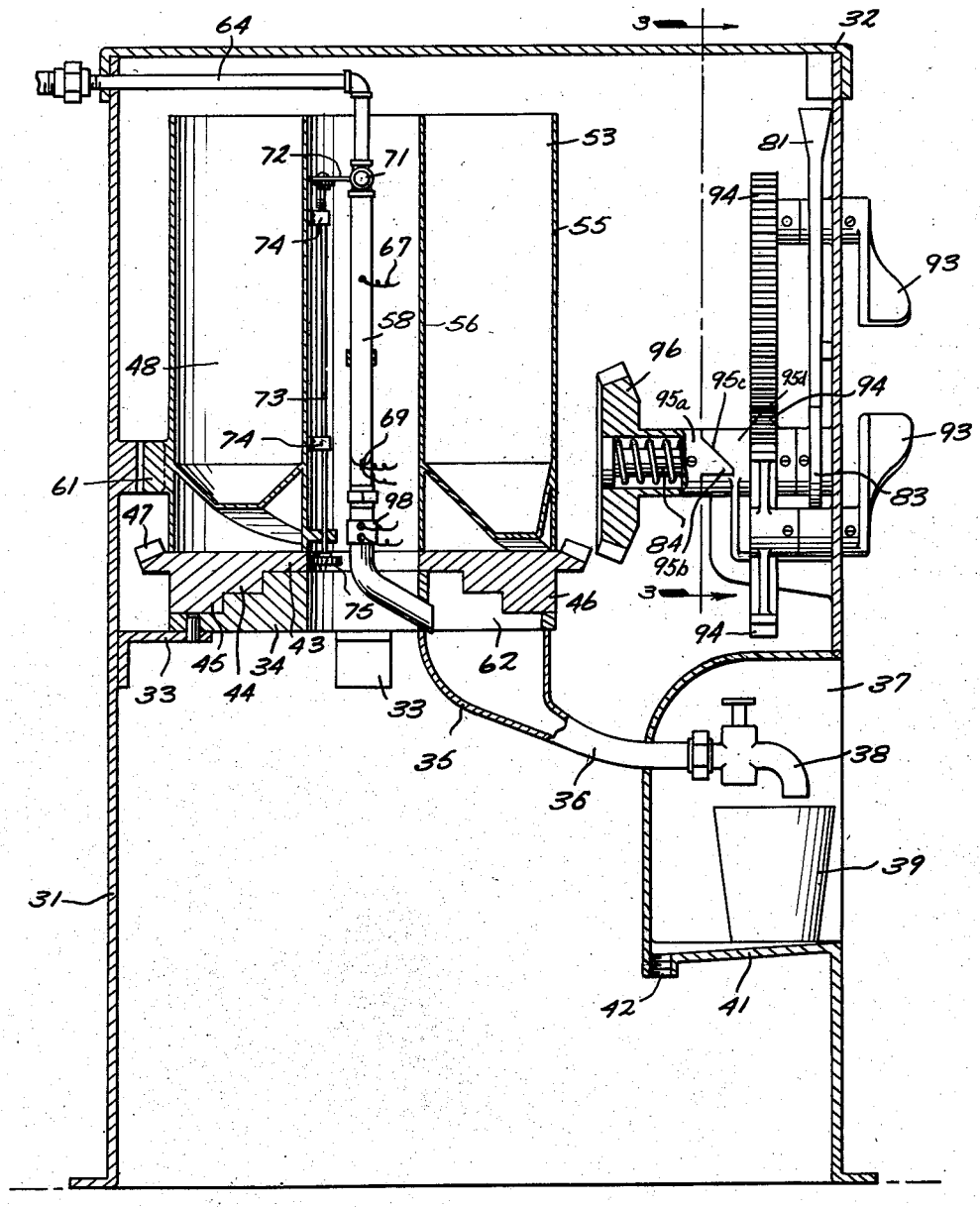

May 20, 1952     G. A. CATANZANO     2,597,063
COIN-CONTROLLED BEVERAGE DISPENSING MACHINE
Filed Dec. 3, 1947     7 Sheets-Sheet 1

INVENTOR.
George A. Catanzano,
BY *Victor J. Evans & Co.*
ATTORNEYS

May 20, 1952  G. A. CATANZANO  2,597,063
COIN-CONTROLLED BEVERAGE DISPENSING MACHINE
Filed Dec. 3, 1947  7 Sheets-Sheet 2
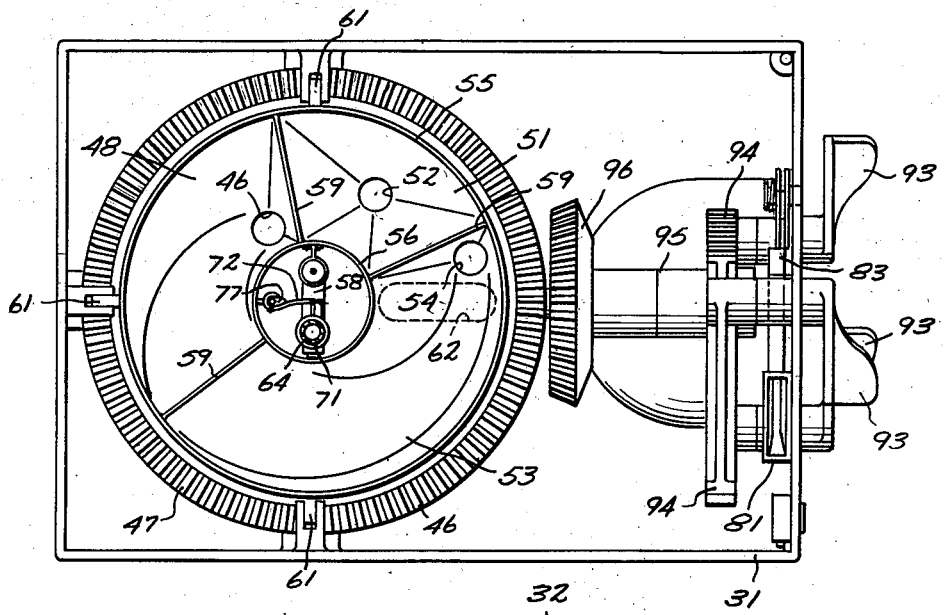
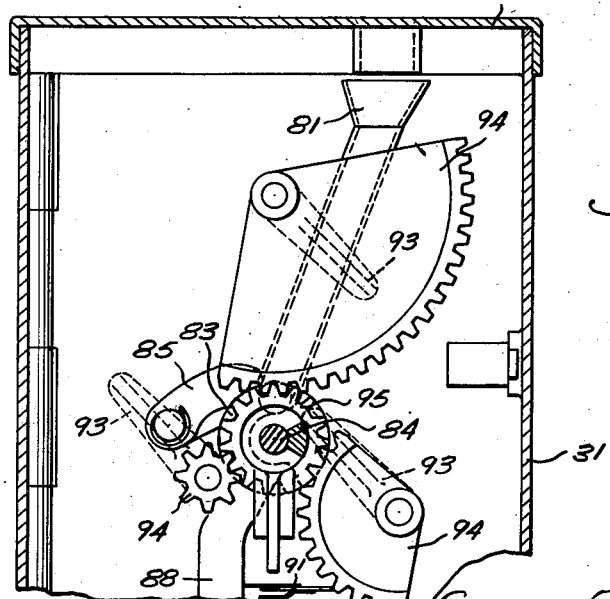
INVENTOR.
George A. Catanzano,
BY Victor J. Evans & Co.
ATTORNEYS

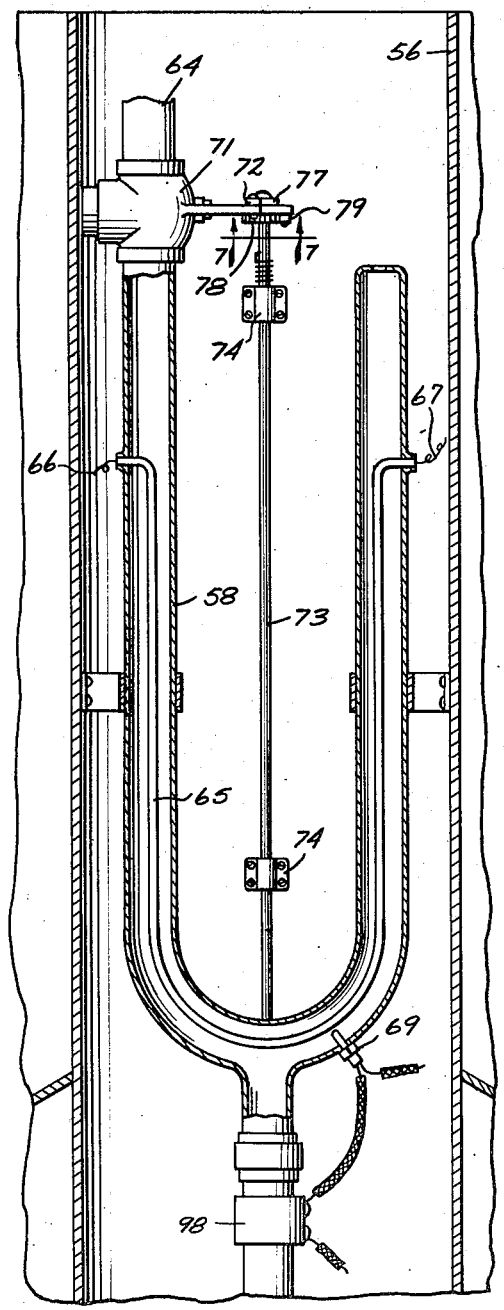
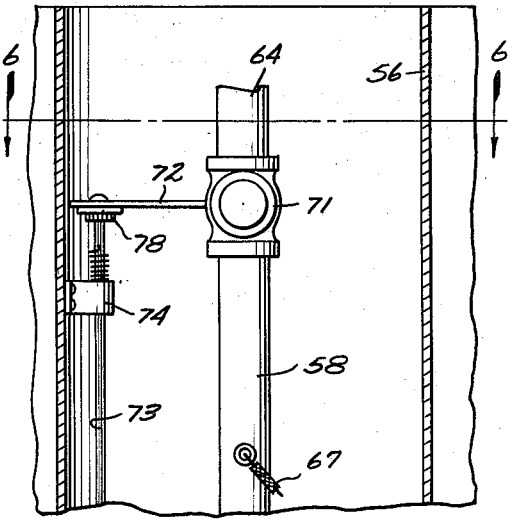
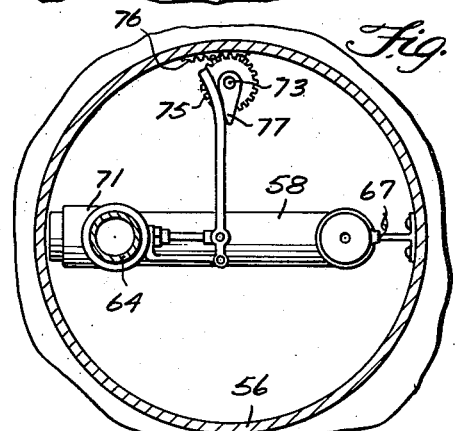

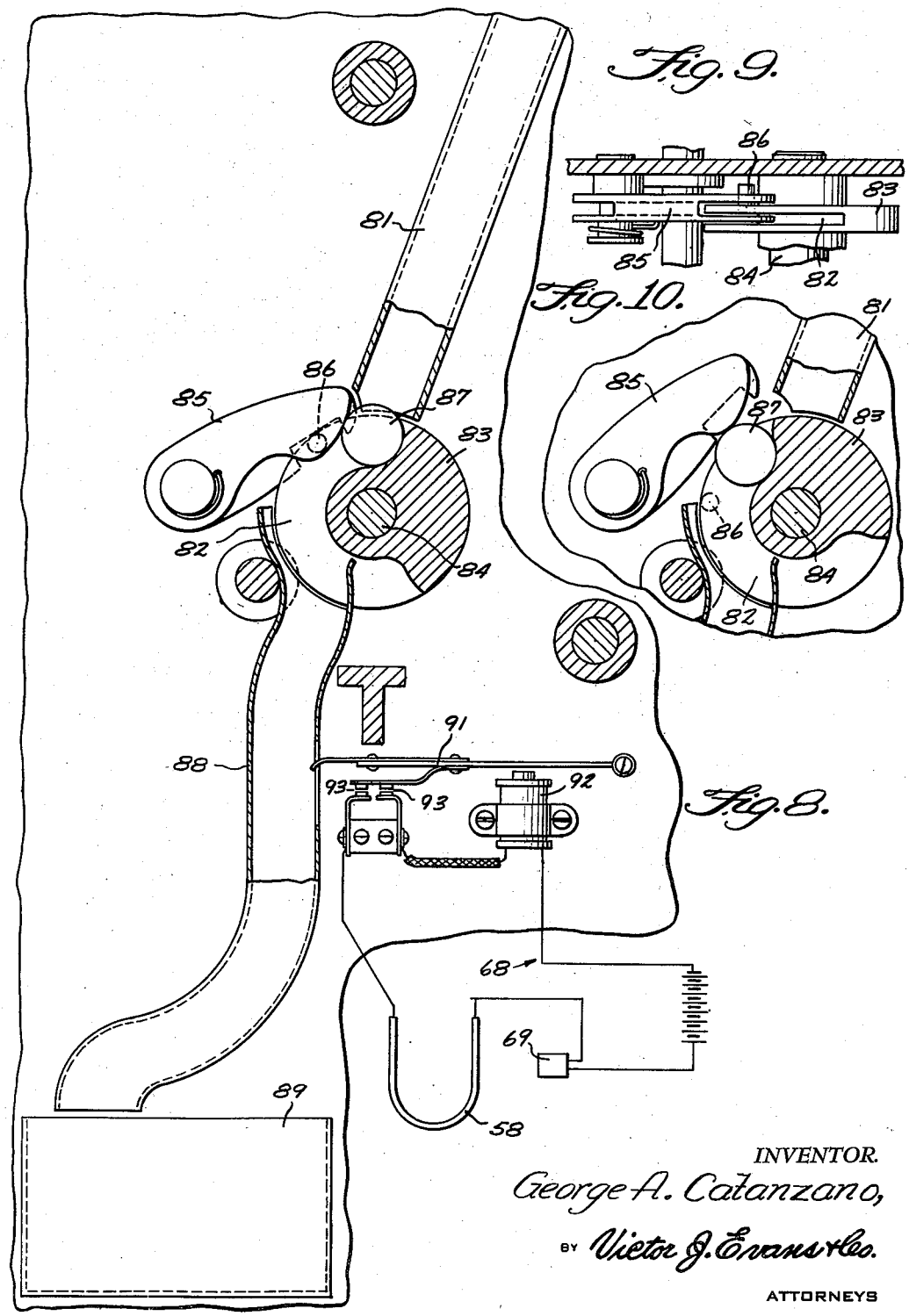

May 20, 1952 — G. A. CATANZANO — 2,597,063
COIN-CONTROLLED BEVERAGE DISPENSING MACHINE
Filed Dec. 3, 1947 — 7 Sheets-Sheet 5
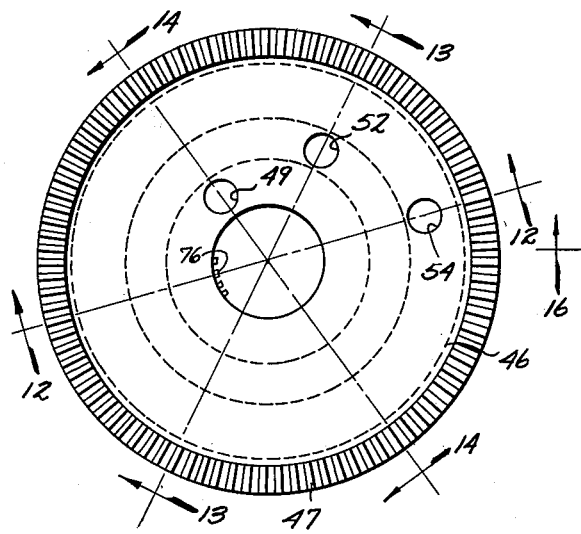
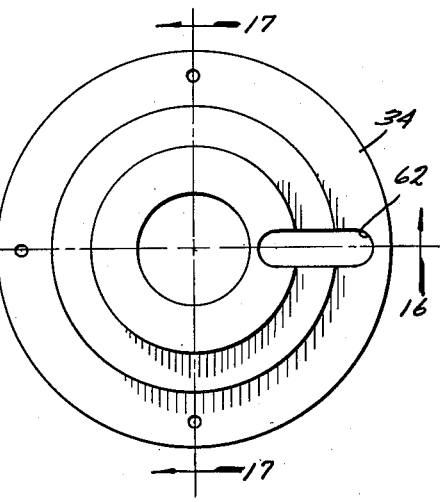
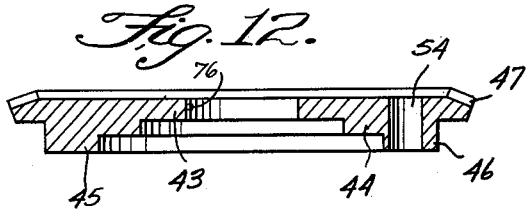
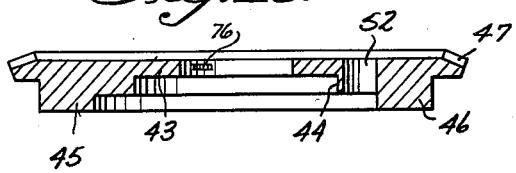
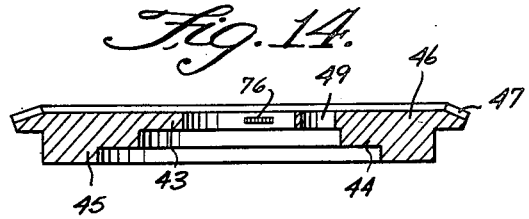
INVENTOR.
George A. Catanzano,
BY Victor J. Evans & Co.
ATTORNEYS

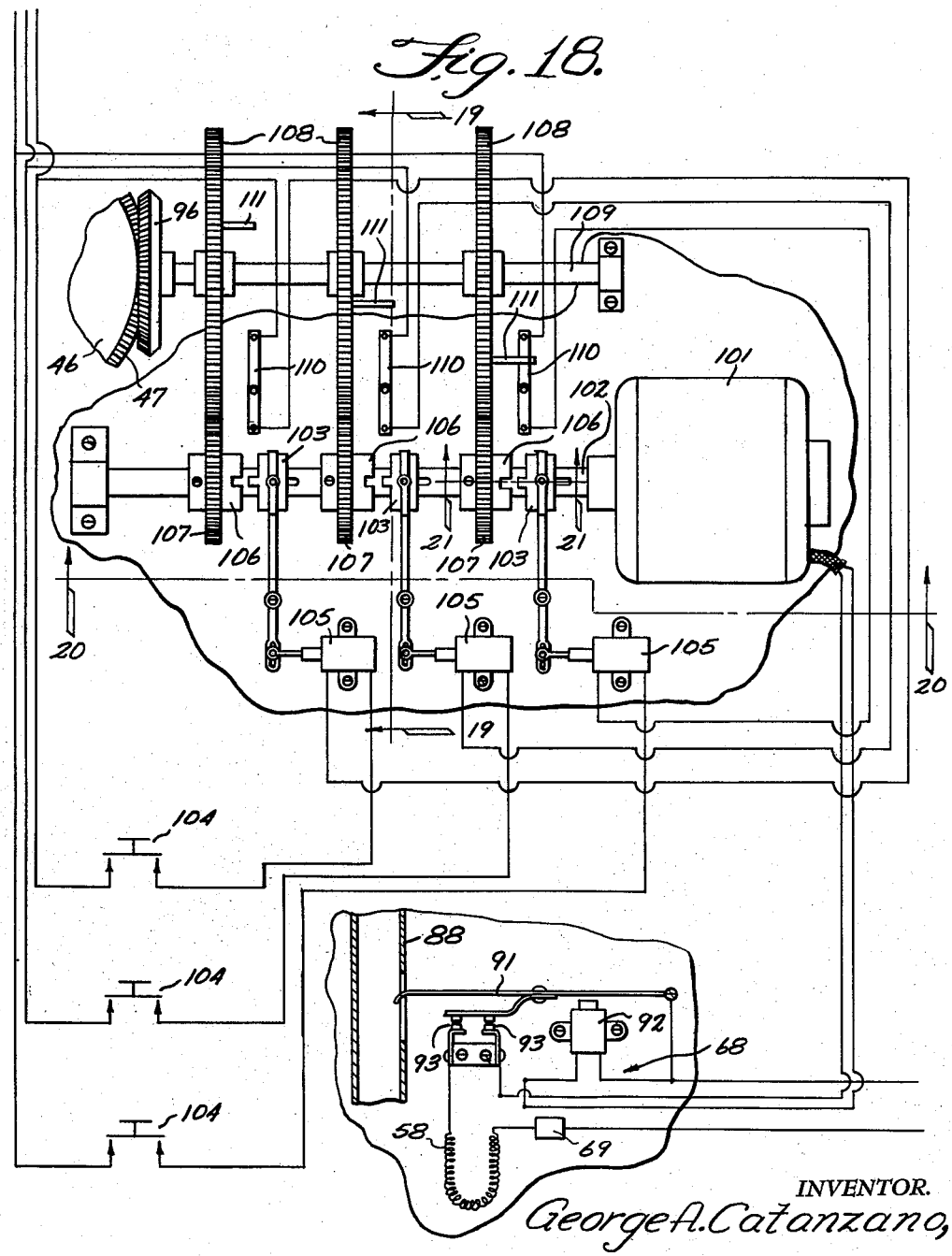

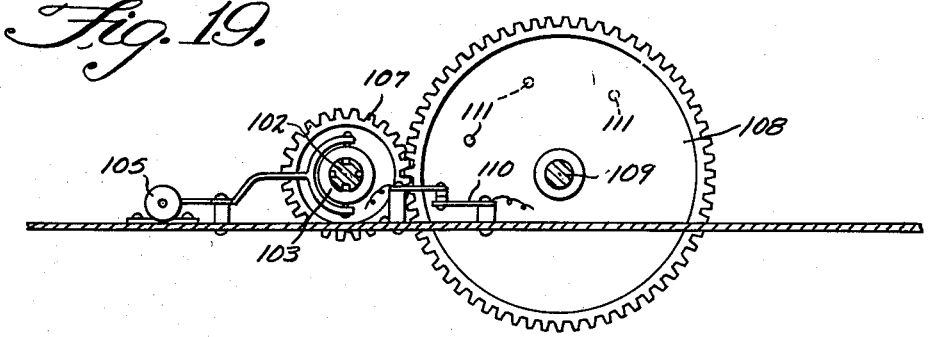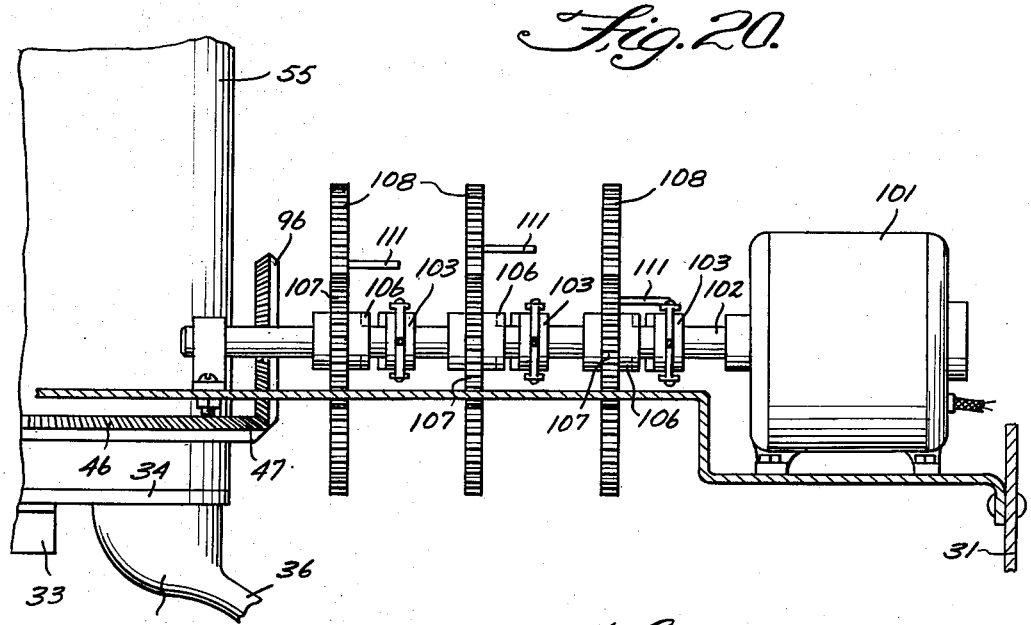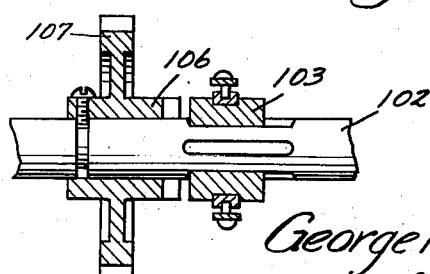

Patented May 20, 1952

2,597,063

UNITED STATES PATENT OFFICE 2,597,063

COIN-CONTROLLED BEVERAGE DISPENSING MACHINE

George A. Catanzano, Arlington, Mass.

Application December 3, 1947, Serial No. 789,465

3 Claims. (Cl. 225—21)

This invention relates to coin operated hot beverage machines.

It is an object of the present invention to provide an automatic coin operated hot beverage machine wherein the portions in the form of powder will be measured in a single plate which may be operated by hand or electric motor to make a complete revolution and to discharge the measured contents into a mixing bowl and wherein upon the completion of the revolution of the measuring plate heated water is dispensed into the bowl to mix the contents and complete the drink, and wherein the containers for the powdered contents are supported on the measuring plate and form a unitary structure therewith and wherein the water heater is located at the center of the measuring plate and extends upwardly between the containers so that the contents of the containers will receive heat to keep it dry and the water will be centrally located for easy delivery to the mixing bowl.

Other objects of the present invention are to provide a thermostatic control system for hot beverage machines which is responsive to the temperature of the hot water dispensed and which will automatically discontinue the movement of the machine parts when once the thermostatic circuit has been operated and wherein the thermostatic element operates the control circuit which has been initially closed by a coin.

Other objects of the present invention are to provide an automatic coin operated hot beverage machine which is of simple construction, simple to operate, compact, has minimum parts, is relatively inexpensive to manufacture and efficient in operation.

For a better understanding of the invention, reference may be had to the following detailed description taken in connection with the accompanying drawings, in which:

Fig. 1 is a cross-sectional view, in elevation, taken through the machine embodying the features of the present invention, Fig. 2 is a top plan view of the machine looking into the powdered material containers, the top cover of the machine having been removed, Fig. 3 is a cross-sectional view, in elevation, taken generally on line 3—3 of Fig. 1, Fig. 4 is an elevational view of the water heater with portions broken away and to show the interior of the same, Fig. 5 is an elevational view of the inlet valve for the hot water heater and of the mechanism for operating the same, Fig. 6 is a transverse cross-sectional view taken on line 6—6 of Fig. 5, Fig. 7 is a cross-sectional view of the operating mechanism for the inlet valve and taken on line 7—7 of Fig. 4, Fig. 8 is an enlarged fragmentary view of the coin operated mechanism and the control circuit actuated by the coin, Fig. 9 is a fragmentary transverse sectional view of the coin receiving mechanism, Fig. 10 is a view similar to that in Fig. 8 but after the coin has been advanced by the receiving element, Fig. 11 is a top plan view of the measuring plate, Figs. 12, 13 and 14 are respectively cross-sectional views taken on lines 12—12, 13—13 and 14—14 of Fig. 11.

Fig. 15 is a top plan view of the supporting plate on which the measuring plate is located to dispense the measured amounts of the powdered material through the supporting plate opening, Figs. 16 and 17 are respectively cross-sectional views taken on lines 16—16 and 17—17 of Fig. 15, Fig. 18 is a top plan view of a motor operated mechanism and the wiring arrangement therefor, Fig. 19 is a sectional view of the electric operating mechanism taken generally on line 19—19 of Fig. 18, Fig. 20 is a longitudinal sectional view of the electric operating mechanism taken generally on line 20—20 of Fig. 18, Fig. 21 is a longitudinal cross-sectional view taken through one of the clutch devices of the electric operating mechanism and on line 21—21 of Fig. 18.

Referring now particularly to Figs. 1 to 17, 31 represents a casing for the machine which is provided at the top with a cover 32 which may be removed when access to the interior of the casing 31 is desired. Within the casing 31 are brackets 33 on which is mounted a supporting plate 34 from which depends a mixing bowl 35 having a drain pipe 36 extending to a recess 37 in the front of the casing. This pipe has a spigot 38 which is turned to drain the contents of the mixing bowl into a cup 39 which may be rested on a drain board 41 within the recess 37 and at the rear of which there is an overflow opening 42 to which an overflow pipe may be connected. The supporting plate 34 has stepped portions for receiving complementary stepped portions 43, 44 and 45 of a measuring plate 46 having a ring gear 47 therearound. In each of the stepped portions of the measuring plate 46 is an opening adapted to receive powdered material such as coffee or cocoa, malted milk, sugar, etc., cream from chambers supported thereabove. Coffee or the like is disposed in a chamber 48 and will be dropped into a measuring hole 49 of the plate 46, Fig. 14. Sugar will be disposed in chamber 51 and will be dropped into an opening 52 of the plate 46, Fig. 13. Powdered cream will be disposed in chamber 53 and will be dropped into an opening 54 of the plate 46, Fig. 12. The chambers are formed within a sleeve 55. In the center of the sleeve 55 is a smaller sleeve 56 adapted to house the water heater 58. Partition walls 59 extend between the formations 55 and 56. The outer sleeve 55 is anchored against rotation by projections 61 extending inwardly from the casing wall 31. The supporting plate 34 has an elongated opening 62 through which the powdered materials are dispensed to the mixing bowl 35. The measuring plate 46 is rotated on the supporting plate.

A water inlet pipe 64 extends over the top of the sleeves and downwardly to heater 53 which is of U-shape, Fig. 4, and contains a heating element 65 connected by lead wires 66 and 67 to a control circuit 68 for the machine, Fig. 8. A thermostat 69 is mounted in the heater 53 and is included in the control circuit.

The inlet pipe has a valve 71 with an operating arm 72 therefor, Fig. 6. On the interior of the small sleeve 56 is a shaft 73 which is journalled in bearings 74 vertically spaced on the interior wall of the sleeve 56. The lower end of the shaft 73 has a gear 75 adapted to be operated by gear teeth 76 on the measuring plate 46. As the plate 46 is rotated it will at times cause the rotation of the shaft 73 and the operation of the valve 71 to admit a new charge of water. A cam 77 cooperates with the arm 72 of the valve to operate the valve, the shaft 73 is confined to one way rotation by a ratchet 78 and a pawl 79.

A coin is dropped into a chute 81 and is delivered to a slot 82 in a coin receiving member 83 that is fixedly mounted on an operating shaft 84, Figs. 8, 9 and 10. A spring latch 85 normally engages with a pin 86 on the coin receiving member 83 to prevent the rotation of the operating shaft 84. As the coin enters the slot 82 engagement will be made with the spring latch 85 to lift the latch to release the member 83 on the shaft 84 so that the shaft can be turned. When the member 83 has been advanced sufficiently the coin as indicated at 87 will be dropped through a chute 88 and delivered to a coin box 89. As the coin drops through a chute a contact arm 91 will be lowered, to close the circuit 68 and cause a holding magnet 92 to maintain the contacts 93 in their closed positions. The water heater 53 will be turned on and the circuit will remain closed until the water has reached a temperature such that it may be dispensed. At that time the circuit 68 will be opened and the holding magnet 92 will be deenergized.

On the casing 31 and extending from the front thereof are turn handles 93. Each of said turn handles is fixed to a shaft and has a gear segment 94 thereon adapted to cooperate with a gear 95 on the operating shaft 84. The shaft 84 has a clutch like element 95a thereon which has teeth 95b with inclined surfaces that coact with similarly shaped surfaces 95c of a support 95d so that as the shaft 84 is turned the element 95a will advance gear 96 into engagement with plate gear 47 whereby to turn the plate 46 to the different stations to receive the respective charges of the powdered material. There are three of the handles 93, one for the coffee, one for the coffee and sugar, and one for the coffee, cream and sugar, and the desired handle will be turned selectively by the purchaser. After the ingredients have been discharged into the mixing bowl 35, a valve 98 may be operated. This is preferably effected by a magnet enclosed therewithin in response to the operation of the thermostat 69. There are turn handles 93 and each has a gear sector. If a person wants black coffee, that handle is turned which is marked coffee and this moves the member that has the opening 54 therein so that the opening 54 moves into alignment with the slot 62, dispensing the coffee. The water is turned off immediately at the start and the cup is filled with water, so the person can have black coffee without sugar or cream.

Next, this handle 93 is turned back to its original position. In case this handle is not turned back, there will be no harm because the next person that comes along turns it back before it will operate again. The same operation is used for dispensing the sugar and cream. Thus, if the person wants sugar, the person turns the proper handle 93 and after you get the sugar, this handle is turned back. Turning the other handle will give cream, sugar, and coffee, since this will cause the member 46 to move as far as it will go. The other handles move the member 46 only as far as the gears permit. This occurs because by moving the handles, the gear 95 is turned, the gear 95 being connected to the shaft 84. By turning the shaft 84, the member 96 is turned and the cam surface 95c moves element 95 into mesh with gear 47. Further rotation of these parts will complete the turning of member 46, corresponding to the handle 93 which is being operated. In returning the member 46 to its normal position, the gear 96 reverses its operation to lock the mechanism.

Referring now particularly to Figs. 18 to 21, there is shown an electric operating mechanism for the machine. This mechanism comprises an electric motor 101 which drives a shaft 102 having a plurality of sliding clutch elements 103 thereon, one for each of the ingredients to be placed in the beverage. These clutch elements are adapted to be selectively engaged by operation of push buttons 104 and magnets 105 with clutch formations 106 of a gear 107. The gear 107 meshes with a large gear 108 on a shaft 109 which carries the bevel gear 96 engaging with the gear plate 47. The same wiring arrangement 68 is used for controlling the water heater as described above. The magnets 105 will be deenergized when corresponding switch 110 is operated by pin projections 111 on gear 108 whereby to release the clutch element 103.

Having now described my invention, I claim:

1. A hot beverage dispensing machine comprising a casing, a supporting plate mounted in the casing, a measuring plate journaled on the supporting plate and having openings therein adapted to measure different quantities of ingredients of the beverage, containers for the ingredients leading to the openings of the measuring plate, operating means for moving the measuring plate in steps, a mixing bowl beneath the supporting plate for receiving the ingredients as the measuring plate is stepped so that its openings are thereover, a hot water device adapted to discharge hot water into the mixing bowl, and means for draining the mixed beverage from the mixing bowl, said measuring and supporting plates being round, outer and inner concentric sleeve formations with partitions extending therebetween defining containers, said formations resting on the measuring plate, means for anchoring the outer sleeve to the casing, and said hot water device being disposed within the inner sleeve.

2. A hot beverage dispensing machine comprising a casing, a supporting plate mounted in the casing, a measuring plate journaled on the supporting plate and having openings therein adapted to measure different quantities of ingredients of the beverage, containers for the ingredients leading to the openings of the measuring plate, operating means for moving the measuring plate in steps, a mixing bowl beneath the supporting plate for receiving the ingredients as the measuring plate is stepped so that its openings are thereover, a hot water heating device adapted to discharge hot water into the mixing bowl, means for draining the mixed beverage from the mixing bowl, said operating mechanism for the measuring plate including an electric motor, gears adapted to be selectively operated and connected with the measuring plate to operate the same, means for selectively operating the gears including push-buttons and electromagnetic devices associated with the gears, and open switches adapted to be operated by the gears when the measuring plate has arrived at the proper station.

3. A hot beverage dispensing machine comprising a casing, a supporting plate mounted in the casing, a measuring plate journaled on the supporting plate and having openings therein adapted to measure different quantities of ingredients of the beverage, containers for the ingredients leading to the openings of the measuring plate, operating means for moving the measuring plate in steps, a mixing bowl beneath the supporting plate for receiving the ingredients as the measuring plate is stepped so that its openings are thereover, a hot water heating device adapted to discharge hot water into the mixing bowl, means for draining the mixed beverage from the mixing bowl, said operating mechanism for the measuring plate including an electric motor, gears adapted to be selectively operated and connected with the measuring plate to operate the same, means for selectively operating the gears including push-buttons and electromagnetic devices associated with the gears, open switches adapted to be operated by the gears when the measuring plate has arrived in the proper stations, a coin operating device, a wiring arrangement adapted to be closed by the coin operated device, said heater having a heating coil and a thermostat, and said thermostat being included in the wiring arrangement to open the same to dispense heated water at the end of a proper time interval.

GEORGE A. CATANZANO.

REFERENCES CITED

The following references are of record in the file of this patent:

UNITED STATES PATENTS

| Number | Name | Date |
| --- | --- | --- |
| 1,465,122 | Frick | Aug. 14, 1923 |
| 1,811,345 | Bell | June 23, 1931 |
| 1,945,343 | Clayton | Jan. 30, 1934 |
| 2,261,338 | Carlson | Nov. 4, 1941 |
| 2,392,452 | Baumann | Jan. 8, 1946 |
| 2,433,054 | Lime | Dec. 23, 1947 |
| 2,452,933 | Joppich | Nov. 2, 1948 |
| 2,493,932 | Swanson | Jan. 10, 1950 |